United States Patent [19]

Werner et al.

[11] Patent Number: 5,716,541
[45] Date of Patent: Feb. 10, 1998

[54] AZEOTROPE-LIKE COMPOSITIONS OF 1,1,1,3,3 PENTAFLUOROPROPANE AND TETRAMETHYLSILANE

[75] Inventors: Joachim Werner, Bethel Park, Pa.;
Scott A. Kane, Wellsburg, W. Va.;
Charles E. Mortimer, Tarentum, Pa.;
Herman P. Doerge, Pittsburgh, Pa.;
Eric F. Boonstra, Oakdale, Pa.

[73] Assignee: Bayer Corporation, Pittsburgh, Pa.

[21] Appl. No.: 700,345

[22] Filed: Sep. 23, 1996

[51] Int. Cl.$^6$ ........................................ C09K 5/04
[52] U.S. Cl. ............... 252/67; 62/114; 252/364; 521/86; 521/98; 521/110; 521/131; 556/465; 570/134
[58] Field of Search .................... 252/67, 364; 62/114; 556/465; 570/134; 521/110, 131, 86, 98

[56] References Cited

U.S. PATENT DOCUMENTS

| | | | |
|---|---|---|---|
| 4,055,507 | 10/1977 | Dastur et al. | 252/162 |
| 4,076,644 | 2/1978 | Burt et al. | 252/182 |
| 4,898,893 | 2/1990 | Ashida | 521/131 |
| 4,900,365 | 2/1990 | Lund et al. | 134/12 |
| 4,960,804 | 10/1990 | Doerge | 521/130 |
| 5,035,833 | 7/1991 | Ogawa et al. | 252/182.24 |
| 5,096,933 | 3/1992 | Volkert | 521/131 |
| 5,106,527 | 4/1992 | Doerge et al. | 252/172 |
| 5,227,088 | 7/1993 | Swan et al. | 252/172 |
| 5,283,003 | 2/1994 | Chen | 252/350 |
| 5,308,881 | 5/1994 | Londrigan et al. | 521/112 |
| 5,362,764 | 11/1994 | Londrigan et al. | 521/112 |
| 5,395,859 | 3/1995 | Demmin et al. | 521/125 |
| 5,426,127 | 6/1995 | Doerge | 521/131 |
| 5,433,880 | 7/1995 | Minor et al. | 252/67 |
| 5,441,659 | 8/1995 | Minor | 252/67 |
| 5,461,084 | 10/1995 | Doerge | 521/167 |
| 5,488,070 | 1/1996 | Falke et al. | 521/51 |
| 5,492,941 | 2/1996 | Falke et al. | 521/51 |
| 5,496,866 | 3/1996 | Sommerfeld et al. | 521/131 |
| 5,538,659 | 7/1996 | Chisolm et al. | 252/67 |
| 5,558,810 | 9/1996 | Minor et al. | 252/67 |

FOREIGN PATENT DOCUMENTS

| | | |
|---|---|---|
| 1141995 | 6/1989 | Japan . |
| 1141996 | 6/1989 | Japan . |
| 95/08603 | 3/1995 | WIPO . |

OTHER PUBLICATIONS 1,1,1,4,4,4 Hexafluorobutane, a New Non–Ozone–Depleting Blowing Agent for Rigid PUR Foams, Polyurethanes World Congress 1991, Sep. 24–26, pp. 734–739.

*Primary Examiner*—Rabon Sergent
*Attorney, Agent, or Firm*—Joseph C. Gil; Lyndanne M. Whalen

[57] ABSTRACT

Azeotropic compositions made up of from about 60 to about 78% by weight of 1,1,1,3,3-pentafluoropropane and from about 22 to about 40% by weight of tetramethylsilane have been found to be particularly useful as blowing agents for the production of polyurethane foams.

3 Claims, 1 Drawing Sheet

AZEOTROPE-LIKE COMPOSITIONS OF 1,1,1,3,3 PENTAFLUOROPROPANE AND TETRAMETHYLSILANE

BACKGROUND OF THE INVENTION

The present invention relates to novel azeotropic compositions, a process for the production of foams in which these azeotropic compositions are used and to the foams produced using these azeotropic compositions.

The use of trichloromonofluoromethane (CFC-11) and other chlorofluorocarbons as blowing agents in the production of urethane foams is well known. These CFC blowing agents are also known to have an adverse effect upon the ozone layer in the atmosphere. The urethane foam industry is therefore investigating methods for producing foams with good physical properties without using CFC blowing agents.

Initially, the most promising alternatives appeared to be hydrogen-containing chlorofluorocarbons (HCFCs). U.S. Pat. No. 4,076,644, for example, discloses the use of 1,1-dichloro-2,2,2-trifloroethane (HCFC-123) and 1,1-dichloro-1-fluoroethane (HCFC-141b) as blowing agents for the production of polyurethane foams. However, HCFCs also have some ozone-depletion potential. There is therefore mounting pressure to find substitutes for the HCFCs as well as the CFCs.

Alternative blowing agents which are currently considered promising because they contain no ozone-depleting chlorine are fluorocarbons (FCs) and partially fluorinated hydrocarbons (HFCs). The use of 1,1,1,4,4,4-hexafluorobutane as a blowing agent is disclosed in Lamberts, "1,1,1,4,4,4-hexafluorobutane, a New Non-Ozone-Depleting Blowing Agent for Rigid PUR Foams", *Polyurethanes World Congress* 1991 (Sep. 24–26), pages 734–739.

U.S. Pat. No. 4,898,893 teaches that a blend of a liquid hydrocarbon and a halogenated hydrocarbon is useful as a blowing agent for the production of isocyanurate foams.

The use of mixtures of a chlorofluorocarbon having a boiling point between 74° and 120° F. and an alkyl alkanoate having a molecular weight of no more than 88 as a blowing agent for foams is disclosed in U.S. Pat. No. 4,960,804; HCFC-123 and HCFC-141b are among the chlorofluorocarbons disclosed therein.

U.S. Pat. No. 5,035,833 discloses the use of a mixture of dichlorotrifluoroethane and at least one paraffin having 5 or 6 carbon atoms as blowing agents useful in the production of rigid polyurethane foams.

U.S. Pat. No. 5,096,933 discloses a process for the production of rigid polyurethane foams in which cyclopentane, cyclohexane or a combination of cyclopentane and cyclohexane may be used as a blowing agent. A low boiling compound (i.e., boiling point less than 35° C.) having no more than 4 carbon atoms which is homogeneously miscible in cyclopentane and/or cyclohexane may optionally be included.

Azeotropes of HCFCs and various compounds and azeotropes of organic compounds which may be used in combination with HCFCs have also been described in the prior art as being useful blowing agents for the production of foams.

U.S. Pat. No. 4,900,365, for example, teaches that azeotropes of dichlorotrifluoroethane and isopentane are useful in the production of polyurethane foams.

U.S. Pat. No. 5,106,527 discloses the use of azeotropes of 2-methyl butane and 1,1-dichloro-1-fluoroethane as blowing agents for the production of rigid, closed cell foams.

The azeotropic mixtures taught in U.S. Pat. No. 5,166,182 must have boiling points below 50° C. These azeotropic mixtures are formed from organic compounds having surface active properties that enable the blended azeotropic mixture to become miscible with polymer resins. Examples of the organic compounds described as being useful in the production of such azeotropes include: n-pentane, acetone, methyl alcohol, methyl formate, ethyl formate, ethyl alcohol, 2-methyl butane, nitromethane, cyclopentane, 2,3-dimethyl butane, 2,2-dimethyl butane and dimethyl sulfide. These azeotropes may be used in combination with fluorocarbons but an azeotrope in which a fluorocarbon is one of the components is not taught or suggested. U.S. Pat. No. 5,227,088 discloses azeotrope-like compositions which are made up of 1-chloro-3,3,3-trifluoropropane and a hydrocarbon containing five or six carbon atoms.

U.S. Pat. No. 5,283,003 discloses a blowing agent which is made up of at least one five-carbon member hydrocarbon, a chlorinated alkane and methyl formate. Methylene chloride is the preferred chlorinated alkane.

Azeotropic mixtures in which HCFCs are included are also known to be useful as cleaning solvents. U.S. Pat. No. 4,055,507, for example, discloses an azeotropic mixture of 1,2-dichloro-1,1-difluoroethane and 3-methylpentane which is taught to be useful as such a solvent. Japanese 1,141,995 discloses an azeotropic mixture of 67 to 87% by weight of HCFC-123 and 13 to 33% by weight of 2-methyl butane which is useful as a cleaning solvent. Japanese 1,141,996 discloses an azeotropic mixture of HCFC-141b and n-pentane or 2-methyl butane or 2,2-dimethyl butane which is also taught to be useful as a cleaning solvent.

Hydrofluorocarbons (HFCs) and mixtures of these compounds themselves or with other blowing agents have also been considered as possible alternatives to CFC blowing agents. U.S. Pat. No. 5,496,866, for example, discloses a number of polyfluoroalkanes useful as propellants. 1,1,1,3,3-pentafluoropropane (HFC-245fa) is described as one of the most promising of the CFC blowing agents in Knopeck et al, "Status Report on the Development of a Liquid HFC Blowing Agent", 35th Annual Polyurethane Technical/Marketing Conference, Oct. 9–12, 1994, pages 115–12; Williams et al, "Update on the Development of HFC-245fa as a Liquid HFC Blowing Agent", *Polyurethane* 1995, Sep. 26–29, 1995, pages 2–9; and in Doerge, "Zero ODP HFC Blowing Agents for Appliance Foam", *Polyurethane* 1995, Sep. 26–29, 1995, pages 432–435.

WO 94/22973 teaches that mixtures of hexafluoropropane and a hydrofluorocarbon, which may or may not be azeotropic, are useful as refrigerants, cleaning agents and expansion agents.

WO 95/08603 discloses that compositions made up of two hydrofluorocarbons such as 1,1-difluoroethane and pentafluoropropane are useful as refrigerants, cleaning agents and expansion agents.

U.S. Pat. No. 5,433,880 discloses two-component refrigerant compositions in which the first component is selected from a group of specified sulfur-containing fluoride compounds and the second component is selected from a specified group of known hydrofluorocarbons.

U.S. Pat. No. 5,395,859 discloses foam-forming compositions in which the blowing agent is a hydrohalocarbon. A key feature of these disclosed compositions is the metal chloroalkanoate or metal(haloalkoxyacyl)-carboxylate trimerization catalyst which stabilizes the hydrohalocarbon blowing agent and reduces the degree of decomposition of that hydrohalocarbon blowing agent.

SUMMARY OF THE INVENTION

It is an object of the present invention to provide novel azeotropic compositions.

It is a further object of the present invention to provide an azeotropic composition which contains no chlorine and therefore has an ozone depletion potential of zero.

It is also an object of the present invention to provide a process for the production of urethane foams in which no chlorine-containing blowing agent is employed.

It is another object of the present invention to provide polyurethane foams having good physical properties, which foams are produced without the use of a chlorine-containing blowing agent.

These and other objects which will be apparent to those skilled in the art are accomplished with the azeotropic compositions of the present invention. These azeotropic compositions are made up of from about 60 to about 78% by weight of 1,1,1,3,3-pentafluoropropane and from about 22 to about 40% by weight of tetramethylsilane. These azeotropic compositions are included in a foam-forming mixture which includes an isocyanate and isocyanate-reactive material. The foams made with these azeotropic compositions are characterized by good physical properties.

BRIEF DESCRIPTION OF THE DRAWING

The drawing is a graph showing a plot of the mole fraction of tetramethylsilane in the vapor phase versus the mole fraction of tetramethylsilane in the liquid phase of varying mixtures of tetramethylsilane and 1,1,1,3,3-pentafluoropropane refluxing at steady state at one atmosphere.

DETAILED DESCRIPTION OF THE INVENTION

Figure 1:
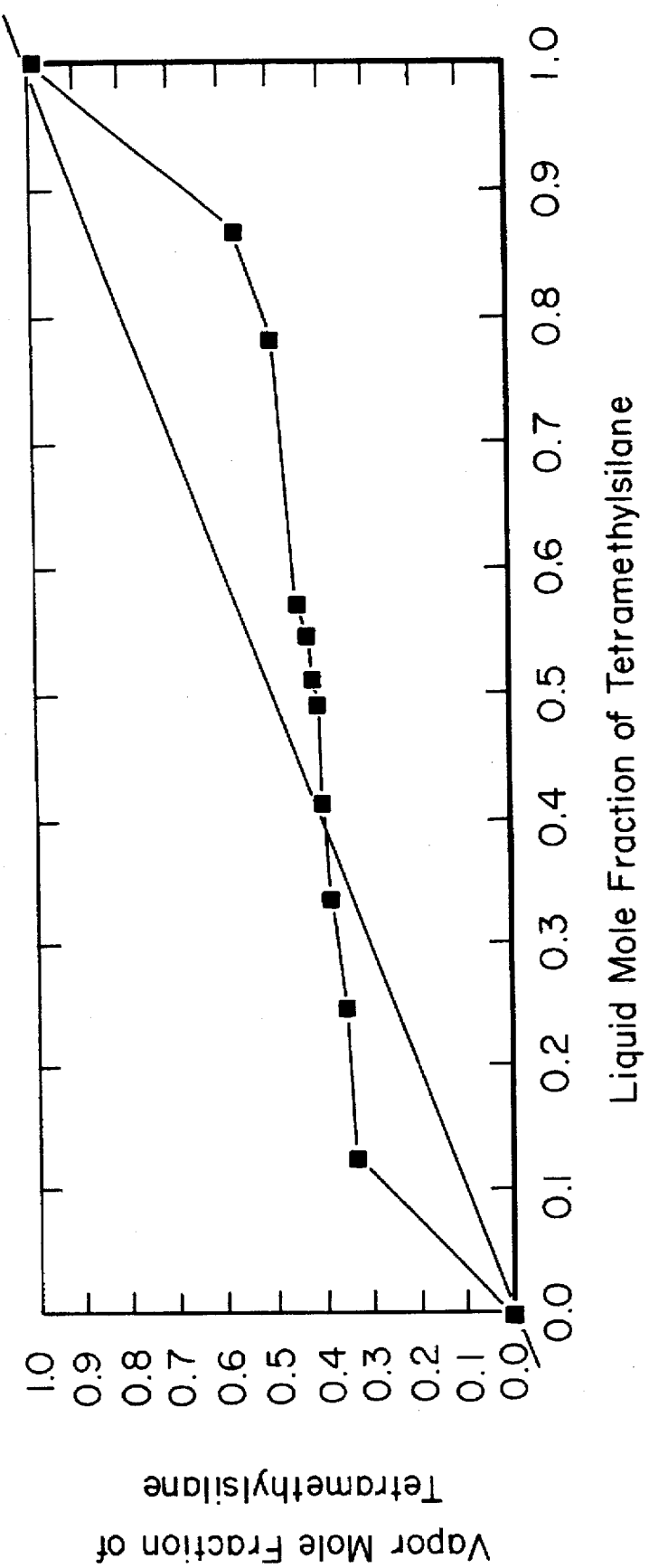

The present invention relates to an azeotropic composition which is particularly useful for the production of rigid foams. This azeotropic composition may also be used for solvent cleaning applications. More particularly, the present invention is directed to azeotrope-like compositions consisting essentially of from about 60 to about 78% by weight (50 to 70 mol %) of 1,1,1,3,3-pentafluoropropane (based on the total weight of the azeotropic composition) and from about 22 to about 40% by weight (30 to 50 mol %) of tetramethylsilane (also known as "TMS") (based on the total weight of the azeotropic composition).

The compounds which are essential to the compositions of the present invention are tetramethylsilane (boiling point= 26.6° C.) and 1,1,1,3,3-pentafluoropropane (boiling point= 15.3° C.). 1,1,1,3,3-pentafluoropropane is also known by those skilled in the art as HFC-245fa. The tetramethylsilane used in the compositions of the present invention may be of normal commercial purity, i.e., at least 95% tetramethylsilane.

The composition made up of from about 60 to about 78% by weight 1,1,1,3,3-pentafluoropropane and from about 22 to about 40% by weight tetramethylsilane is azeotrope-like in nature in that compositions within these ranges exhibit a substantially constant boiling point. Because they have such a substantially constant boiling point (7.5° C.±1.0° C. at one atmosphere), the mixture does not tend to fractionate to any great extent upon evaporation. After evaporation, only a small difference exists between the composition of the vapor phase and the initial liquid phase. This difference is so small that the compositions of the vapor and liquid phases are considered to be substantially identical. Therefore, any mixture within the above-noted ranges exhibits properties which are characteristic of a true binary azeotrope.

The azeotropic compositions consisting essentially of from about 65 to about 74% by weight 1,1,1,3,3-pentafluoropropane and from about 26 to about 35% by weight tetramethylsilane are particularly preferred azeotropic compositions. The composition consisting essentially of 70% by weight 1,1,1,3,3-pentafluoropropane and 30% by weight tetramethylsilane has been established, within the accuracy of the calibration procedure described below, as the true binary azeotrope with a boiling point of about 7.5° C.±1.0° C. at one atmosphere.

The drawing shows a graph on which the mole fraction of tetramethylsilane in the vapor phase is plotted against the mole fraction of tetramethylsilane in the liquid phase of a mixture of tetramethylsilane and 1,1,1,3,3-pentafluoropropane refluxing at steady state. These mole fractions were obtained by gas chromatography and were adjusted to be quantitative by using a calibration curve as is described more fully below. The point at which the mole fraction curve crosses the line with a slope of 1 and intercept 0 is, by definition, the true binary azeotropic composition.

The calibration curve used to calibrate the gas-chromatographic results was generated as follows. A series of blends of tetramethylsilane with 1,1,1,3,3-pentafluoropropane were prepared with from 0 to 100 mole percent of tetramethylsilane in 10% increments. The mole percent of 1,1,1,3,3-pentafluoropropane in each blend was the difference between 100 mole percent and the mole percent of tetramethylsilane. First, each blend was injected into a Gas Chromatograph ("GC") to establish a correlation between relative peak areas versus actual molar concentrations. This was done by making duplicate samples of each blend and measuring each sample twice. This data was used to establish the calibration curve and a 95% confidence interval which was used to establish the range of error for the azeotropic compositions.

The relative molar amounts of 1,1,1,3,3-pentafluoropropane and tetramethylsilane necessary to form an azeotropic composition were then determined by a two-step process. In the first step, tetramethylsilane alone was charged to a reactor. Subsequently, 1,1,1,3,3-pentafluoropropane was added to the reactor in regular increments indicated by the data points in the graph. After each addition of 1,1,1,3,3-pentafluoropropane, the contents of the reactor were allowed to reflux for 10-15 minutes with the reflux condenser at 0° C. and open to the atmosphere through a drying tube. After a steady state was achieved, samples of the liquid and vapor were taken through sample ports. The temperature of the liquid in the reactor was measured and the vapor temperature was measured at a point between the reactor and the condenser. Duplicate samples were injected into the GC and the relative peak areas were recorded. These relative peak areas were converted to mole fractions by using the calibration curve.

In the second step, 1,1,1,3,3-pentafluoropropane was charged to a reactor. Subsequently, tetramethylsilane was added in increments indicated by the data points in the graph. The contents of the reactor were then heated and samples were taken and analyzed in the same manner as was described above in the first step. The data was plotted with the resultant graph being shown in the FIGURE.

An azeotrope is defined as a mixture of liquids where, at the boiling point, the concentration of the components is the same in the liquid and vapor phases. The point at which the mole fraction plot crosses the line having a slope of 1 and an intercept of 0 is the expected azeotropic composition.

The azeotropic compositions of the present invention are particularly useful as chlorine-free blowing agents for the production of closed cell, rigid foams. Foams made with the azeotropic compositions of the present invention have approximately the same density as foams produced with HFC-245fa alone and relatively low K-factors despite the fact that less HFC-245fa is required.

Foams may be produced with the azeotropic compositions of the present invention by reacting a) an isocyanate-reactive material with b) an organic polyisocyanate in the presence of one of the azeotropic compositions of the present invention, optionally in the presence of a catalyst or other known additives.

Any of the known isocyanate-reactive materials may be used to produce foams in accordance with the present invention. Polyether polyols are preferably used to produce rigid foams in accordance with the present invention. Amine-initiated polyether polyols having functionalities of from about 3 to about 4 and molecular weights of at least about 149, preferably from about 149 to about 1500, most preferably from about 300 to about 800 are particularly preferred. These amine-based polyols may be prepared by reacting an amine, polyamine or aminoalcohol and optionally other initiators (with or without water) with propylene oxide and optionally, ethylene oxide, in the presence of an alkaline catalyst. The product is then treated with an acid, preferably a hydroxy-carboxylic acid to neutralize the alkaline catalyst. U.S. Pat. No. 2,697,118 discloses a suitable process for the production of such amine-initiated polyols.

Examples of suitable amine initiators include: ammonia, ethylene diamine, diethylene triamine, hexamethylene diamine, amines such as toluene diamine, and aminoalcohols. Aminoalcohols, particularly, monoethanolamine, diethanolamine, and triethanolamine are preferred initiators.

It is preferred that the amine initiator be reacted with propylene oxide, although it may also be reacted with ethylene oxide. If used, the ethylene oxide may be used in an amount of up to 100% by weight of the total alkylene oxide used. The propylene oxide is generally used in an amount of from about 40 to about 100% by weight of the total alkylene oxide employed, preferably from about 60 to about 100% by weight. The total amount of alkylene oxide used is selected so that the product polyol will have an average molecular weight (i.e., number average) of at least about 149, preferably from about 149 to about 1500.

The amine-based polyether polyol is included in the foam-forming mixture in an amount of from about 20 to about 70% by weight, based on the total foam forming mixture, preferably from about 40 to about 50% by weight.

Other polyether polyols (i.e., polyether polyols which are not based on an amine) known to be useful in the production of rigid polyurethane foams as well as polyester polyols may also be used in the practice of the present invention. Combinations of an amine-initiated polyol and polyols which are not based upon amines are particularly preferred. When such mixtures are used, the amine-initiated polyol is generally included in an amount of at least 20% by weight, preferably from about 50 to about 80% by weight.

When the amine-initiated polyol is based upon an aminoalcohol, polyester polyols having functionalities of from about 2 to about 3 (preferably from about 2 to about 2.5) and molecular weights (number average as determined by end group analysis) of from about 180 to about 900, preferably from about 300 to about 600 are preferably included in the polyol mixture in an amount of from about 5 to about 50%, most preferably from about 15 to about 35% by weight of the total amount of polyol.

Any of the known organic isocyanates, modified isocyanates or isocyanate-terminated prepolymers made from any of the known organic isocyanates may be used in the practice of the present invention. Suitable isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydrotoluene diisocyanate and its isomers, isophorone diisocyanate, dicyclohexylmethane diisocyanates, 1,5-naphthalene diisocyanate, 1-methylphenyl-2,4-phenyl diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyl-4,4'-biphenylene diisocyanate; triisocyanates such as 2,4,6-toluene triisocyanate; and polyisocyanates such as 4,4'-dimethyldiphenylmethane-2,2',5,5'-tetraisocyanate and the polymethylene polyphenyl polyisocyanates.

Undistilled or crude polyisocyanate may also be used. The crude toluene diisocyanate obtained by phosgenating a mixture of toluene diamines and the diphenylmethane diisocyanate obtained by phosgenating crude diphenylmethane diamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing NCO groups and having an NCO content of from about 25 to about 35% by weight, preferably from about 28 to about 32% by weight. Prepolymers based on polyether polyols or polyester polyols and diphenylmethane diisocyanate are particularly preferred. Processes for the production of these prepolymers are known in the art.

The most preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 25 to about 35% by weight, due to their ability to crosslink the polyurethane.

Any of the catalysts known to be useful in the production of rigid polyurethane foams may be employed in the practice of the present invention. Tertiary amine catalysts are particularly preferred. Specific examples of suitable catalysts include: pentamethyl-diethylene triamine, N,N-dimethyl-cyclohexyl amine, N,N',N"-dimethylamino-propyl-hexahydro triazine, tetramethylene diamine, tetramethylbutylene diamine, and dimethyl-ethanolamine. Pentamethyl-diethylene triamine, N,N',N"-dimethyl-amino-propyl-hexahydro triazine, and N,N-dimethyl-cyclohexyl amine are particularly preferred.

Materials which may optionally be included in the foam-forming mixtures of the present invention include: chain extenders, crosslinking agents, surfactants, pigments, colorants, fillers, antioxidants, flame retardants and stabilizers. Carbon black is a preferred additive.

Any of the known isocyanate-reactive materials, organic polyisocyanates, catalysts and foam stabilizers may be used to produce foams with the azeotropic compositions of the present invention.

Any of the known methods for producing polyurethane foams may be used in the practice of the present invention. Suitable methods include reaction of the various reactants using the known one-shot process, prepolymer process or semi-prepolymer process.

Having thus described our invention, the following Examples are given as being illustrative thereof. All parts and percentages given in these Examples are parts by weight or percentages by weight, unless otherwise indicated.

EXAMPLES

The following materials were used in the Examples:

POLYOL A: A polyol prepared by reacting 1 mole of ethylene diamine with 5 moles of propylene oxide having an OH number of 630.

POLYOL B: A polyol prepared by reacting 1 mole of glycerine with 3.3 moles of propylene oxide having an OH number of 250.

R-245fa: 1,1,1,3,3-pentafluoropropane.

TMS: tetramethylsilane.

Tegostab B-8426: A polysiloxane polyether copolymer which is commercially available from Goldschmidt Chemical Corporation.

DMCHA: dimethylcyclohexylamine.

ISO: A polymethylene polyphenyl polyisocyanate prepolymer having an NCO content of approximately 27% by weight which is commercially available from Bayer Corporation under the name Mondur E-577.

Example 1

17.08 parts by weight of R-245fa and 7.32 parts by weight of TMS were mixed. This mixture was then blended with the other B-Side components listed in the Table. ISO was then mixed with the B-Side in a mixing vessel using an air driven stirrer. After 5 seconds of mixing, the reaction mixture was poured into an aluminum mold which measured 14"×14"× 3.5". The amounts of each of the materials are given in the Table. The reactivity times, density and K-factor of the foam product were determined and the results of these determinations are given in the Table.

Example 2

Example 1 was repeated using the same materials with the exception that R-245fa alone (i.e., without TMS) was used as the blowing agent. The amounts of the materials employed and the characteristics of the product foam are reported in the Table.

TABLE

|  | EXAMPLE 1 | EXAMPLE 2 |
|---|---|---|
| B-SIDE |  |  |
| POLYOL A, wt. % | 17.14 | 16.92 |
| POLYOL B, wt. % | 17.14 | 16.92 |
| Tegostab B-8426, wt. % | 0.76 | 0.75 |
| Water, wt. % | 0.76 | 0.75 |
| DMCHA, wt. % | 1.25 | 1.24 |
| R-245fa, wt. % | 2.09 | 8.17 |
| TMS, wt. % | 4.88 | — |
| A-SIDE |  |  |
| ISO, wt. % | 55.97 | 55.26 |
| RESULTS |  |  |
| Mix Time, sec. | 5 | 5 |
| Cream Time, sec. | 6 | 7 |
| Gel Time, sec. | 44 | 43 |
| Density, lb./ft.$^3$ | 1.81 | 1.83 |
| K-factor, Btu-in./hr.ft.$^2$ °C. | 0.144 | 0.140 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An azeotropic composition consisting essentially of
   a) from about 60 to about 78% by weight of 1,1,1,3,3-pentafluoropropane and
   b) from about 22 to about 40% by weight of tetramethylsilane.

2. The azeotropic composition of claim 1 consisting essentially of
   a) from about 65 to about 74% by weight of 1,1,1,3,3-pentafluoropropane and
   b) from about 26 to about 35% by weight of tetramethylsilane.

3. The azeotropic composition of claim 1 consisting essentially of
   a) about 70% by weight of 1,1,1,3,3-pentafluoropropane and
   b) about 30% by weight of tetramethylsilane.

\* \* \* \* \*